United States Patent [19]

Brandenburg

[11] Patent Number: 4,943,895

[45] Date of Patent: Jul. 24, 1990

[54] RETRACTABLE HEADLAMP ASSEMBLY

[75] Inventor: Darrell L. Brandenburg, Anderson, Ind.

[73] Assignee: General Motors Corporation, Detroit, Mich.

[21] Appl. No.: 342,206

[22] Filed: Apr. 24, 1989

[51] Int. Cl.$^5$ .............................................. B60Q 1/00
[52] U.S. Cl. ........................................ 362/66; 362/80; 362/233; 362/272; 362/428
[58] Field of Search ............... 362/65, 66, 80, 227, 362/233, 286, 269, 272, 428

[56] References Cited

U.S. PATENT DOCUMENTS

| 4,217,626 | 8/1980 | Bindle et al. | 362/233 X |
| 4,471,410 | 9/1984 | Nakano | 362/233 X |
| 4,644,448 | 2/1987 | Heiler | 362/66 |

*Primary Examiner*—Stephen F. Husar
*Attorney, Agent, or Firm*—Edward J. Biskup

[57] ABSTRACT

A retractable lamp assembly that is combined with the front end of a vehicle and includes a pair of lamps which can be alternately located within a headlamp opening in the front end of the vehicle so as to selectively project a beam of high intensity light or a beam of low intensity light forwardly of the vehicle.

3 Claims, 1 Drawing Sheet

RETRACTABLE HEADLAMP ASSEMBLY

This invention concerns headlamps in general and more particularly concerns a retractable headlamp assembly that allows a high intensity light and a low intensity light to be alternately positioned within a common opening provided in the front end of the motor vehicle.

More specifically, the retractable headlamp assembly according to the present invention is combined with the front end of a motor vehicle wherein a headlamp opening is provided to one side of the longitudinal center axis of the vehicle. A support bracket is mounted to the rear of the opening for pivotal movement about a horizontal axis and the support bracket serves to support a pair of lamps, one of which is capable of projecting a high intensity beam of light forwardly of the vehicle while the other which is adapted to project a low intensity beam of light forwardly of the vehicle. Actuator means are carried by the vehicle and connected to the support bracket for selectively pivoting the support bracket about the horizontal axis so as to position one of the lamps in the opening and have the other lamp concealed by a portion of the front end of the vehicle and vice versa.

The objects of the present invention are to provide a new and improved retractable headlamp assembly which is provided with a pair of angularly spaced lamps that are rotatable between two positions for selectively providing one or the other of the lamps in a position for projecting a beam of light forwardly of a motor vehicle; to provide a new and improved retractable lamp assembly which includes a support bracket that carries a pair of lamps and is pivotally supported at the front end of a motor vehicle so as to selectively locate one or the other of the lamps in an opening formed in the front end of the vehicle for projecting either a low intensity or a high intensity beam of light forwardly of the vehicle; and to provide a new and improved retractable lamp assembly that is combined with the front end of a vehicle and includes a pair of lamps which can be alternately located within a generally rectangular common opening in the front end of the vehicle so as to selectively project either a beam of high intensity light or a beam of low intensity light forwardly of the vehicle.

Other objects and advantages of the present invention will be apparent from a reading of the following detailed description when taken in conjunction with the accompanying drawings in which.

Figures 1, 2, 3:
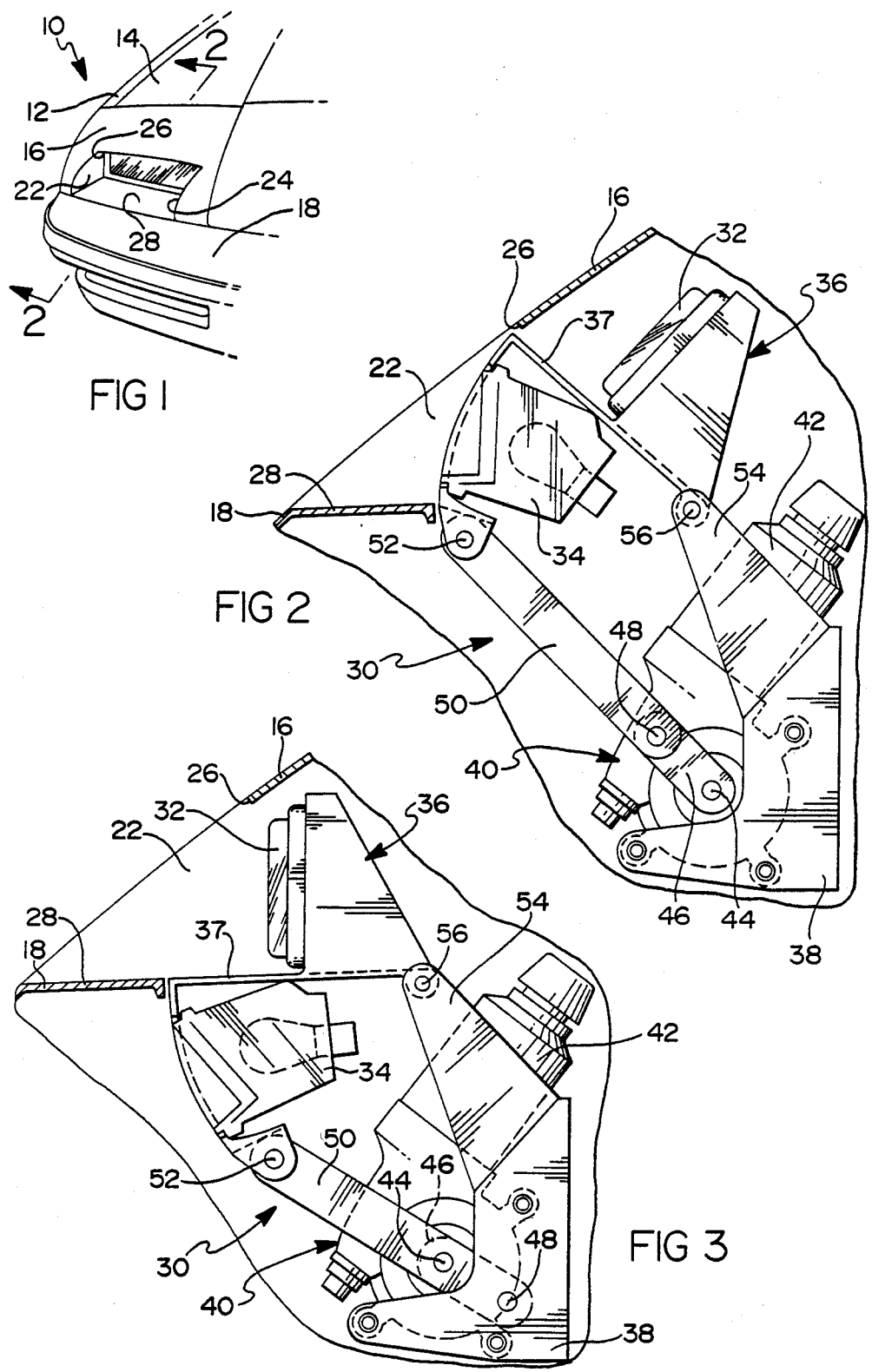
FIG. 1 is a perspective view of a partial front end of a motor vehicle provided with a generally rectangular opening in which is located a retractable headlamp assembly according to the present invention.
FIG. 2 is an enlarged sectional view taken on line 2—2 of FIG. 1 showing the retractable headlamp assembly in one of the two positions between which it is movable.
FIG. 3 is a view similar to that seen in FIG. 2 with the headlamp assembly located in the other of the two positions.

Referring to the drawings and more particularly FIG. 1 thereof, a motor vehicle body 10 is shown having a forwardly sloping vehicle body front end structure which includes a front fender 12, a hood 14, a header panel 16 and a bumper fascia 18. A rectangular headlamp opening is provided in the header panel 16 that is defined by a pair of laterally spaced sidewalls 22 and 24, a horizontal edge 26, and the top horizontal wall 28 of the fascia 18.

As seen in FIGS. 2 and 3, a retractable headlamp assembly 30 is located to the rear of the headlamp opening and includes a pair of lamps 32 and 34 carried by a support housing 36 which includes a filler number 37. The support housing 36, in turn is mounted on a bracket 38 affixed to the vehicle body 10 and supporting an actuator mechanism 40 which serves to selectively position the lamps 32 and 34 between the first position as seen in FIG. 2 wherein the lamp 34 is located in the headlamp opening while the lamp 32 is concealed from view by the header panel 16, and a second position as seen in FIG. 3 wherein the other lamp 32 is located in the headlamp opening and the lamp 34 is concealed from view by the fascia.

The actuator mechanism includes a reversible electric motor 42 which serves to drive a rotatable output shaft 44 onto which one end of a crank 46 is fixed. The other end of the crank 46 is connected by a pivotal connection 48 to one end of a link 50, the other end of which is connected by a pivotal connection 52 to the lower end of the support housing 36. In this regard, it will be noted that the bracket 38 has an upwardly extending arm 54 that supports the lamp support housing 36 for rotation between the aforementioned first position and second position and about a horizontal axis that passes through the center of a pivotal connection 56 that connects the bracket 38 to the housing 36.

It will be understood that the lamp 32 is intended to be either a composite type headlamp or a sealed beam headlamp capable when energized of projecting a low beam or a high beam of high intensity light forwardly of the vehicle. On the other hand, the lamp 34 is intended to be a so-called daytime running lamp capable when energized of projecting a beam of low intensity light forwardly of the vehicle. Thus, when the headlamp assembly 30 is in the position seen in FIG. 2, the lamp 34 is located by the actuator mechanism 30 in the headlamp opening for projecting a beam of low intensity light forwardly of the vehicle. When it is desired to locate the lamp 32 in the opening, the electric motor 42 is energized causing the crank 46 to rotate in a counterclockwise direction until it reaches the position of FIG. 3 when a limit switch (not shown) causes the motor 42 to be deenergized. In the position of FIG. 3, the lamp 32 is located in the opening for projecting the low or high beam of high intensity light forwardly of the vehicle and the filler member 37 is in horizontal alignment with the wall 28. At the same time, the lamp 34 is located beneath the horizontal wall 28 and is concealed from view by the fascia 18 and the filler member 37. When the electric motor 42 is energized again, the crank will rotate in a clockwise direction until it returns to the position of FIG. 2 at which time a limit switch (not shown) will again deenergize the motor 42 and cause the lamp assembly to be positioned as seen in FIG. 2.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination with a motor vehicle the front end of which is provided with an opening for a lamp, a support housing mounted to the rear of said opening for pivotal movement about a horizontal axis, a first lamp for projecting a beam of high intensity light forwardly of the vehicle mounted on said support housing, a second lamp for projecting a beam of low intensity light forwardly of the vehicle mounted on said support housing, and actuator means carried by the vehicle and connected to said support housing for selectively pivoting said support housing about said horizontal axis between a first position wherein said first lamp is located in said opening and the second lamp is concealed by a first portion of said front end of the vehicle and a second position wherein said second lamp is located in said opening and said first lamp is concealed by a second portion of said front end of the vehicle.

2. In combination with a motor vehicle the front end of which is provided with a headlamp opening located to one side of the longitudinal center axis of the motor vehicle, a support housing mounted to the rear of said opening for pivotal movement about a horizontal axis, a first lamp for projecting a beam of high intensity light forwardly of the vehicle mounted on said support housing, a second lamp for projecting a beam of low intensity light forwardly of the vehicle mounted on said support housing and angularly spaced from said first lamp, and actuator means carried by the vehicle and connected to said support housing for selectively pivoting said support housing about said horizontal axis between a first position wherein said first lamp is located in said opening and the second lamp is concealed by a first portion of said front end of the vehicle and a second position wherein said second lamp is located in said opening and said first lamp is concealed by a second portion of said front end of the vehicle.

3. In combination with a motor vehicle the front end of which is provided with a rectangular opening located to one side of the longitudinal center axis of the motor vehicle, a support housing mounted to the rear of said opening for pivotal movement about a horizontal axis a first lamp for projecting a beam of high intensity light forwardly of the vehicle mounted on said support housing, a second lamp for projecting a beam of low intensity light forwardly of the vehicle mounted on said support housing, a filler member forming a part of said support housing and separating said first lamp from said second lamp, and actuator means including a reversible electric motor and a linkage carried by the vehicle and connected to said support housing for selectively pivoting said support housing about said horizontal axis between a first position wherein said first lamp is located in said opening and the second lamp is concealed by said filler member and a first portion of said front end of the vehicle and a second position wherein said second lamp is located in said opening and said first lamp is concealed by a second portion of said front end of the vehicle.

* * * * *